W. J. LOURY.
BAND BRAKE.
APPLICATION FILED JAN. 5, 1921.
1,402,365.
Patented Jan. 3, 1922.
2 SHEETS—SHEET 1.
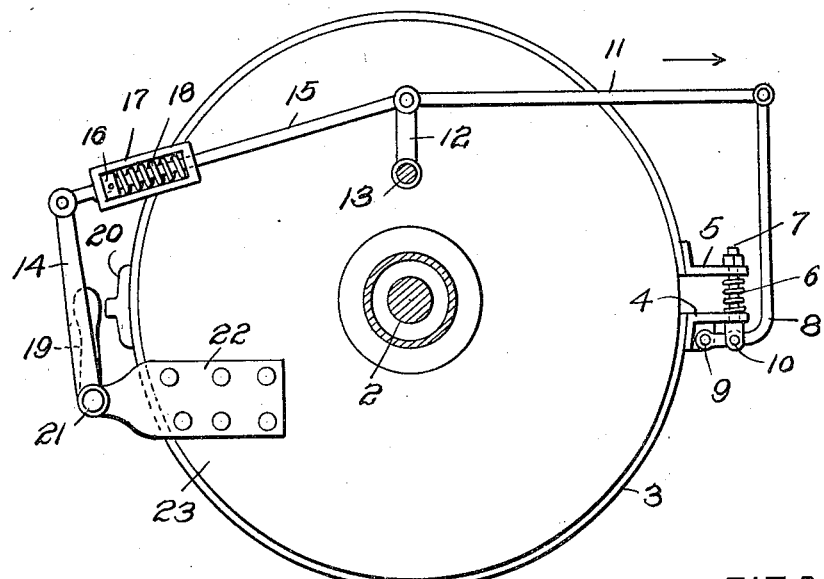
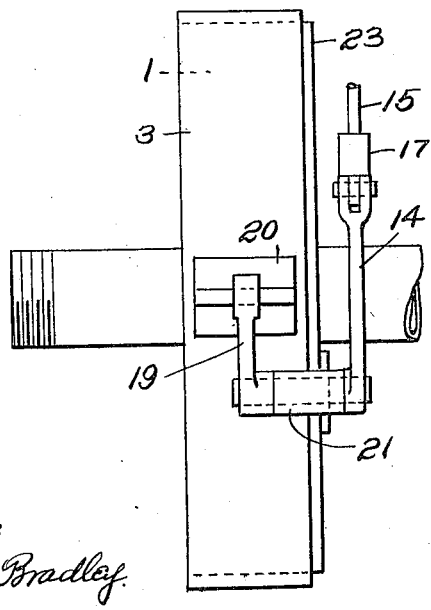
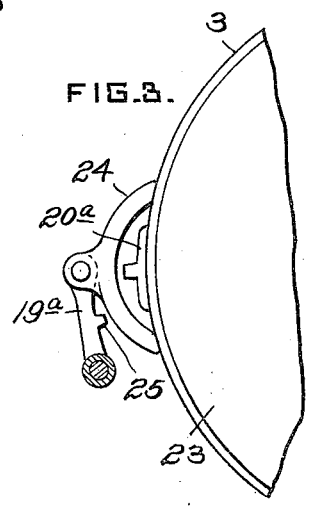
WITNESSES
J. Herbert Bradley
INVENTOR
William J. Loury
by Winter & Brown
his attorneys W. J. LOURY.
BAND BRAKE.
APPLICATION FILED JAN. 5, 1921.
1,402,365. Patented Jan. 3, 1922.
2 SHEETS—SHEET 2.
FIG. 4. FIG. 6.
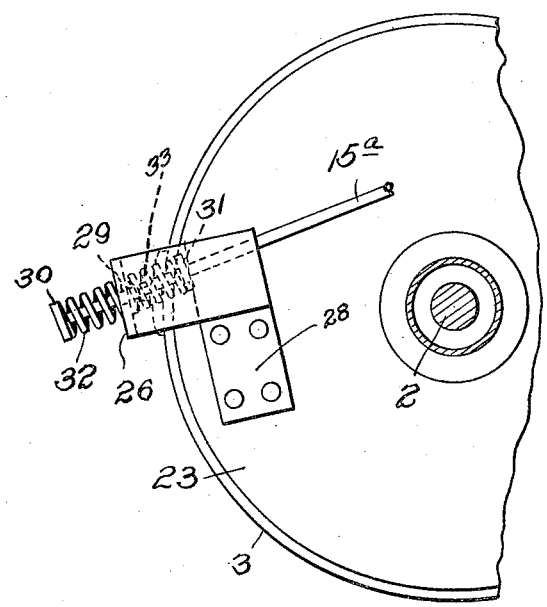
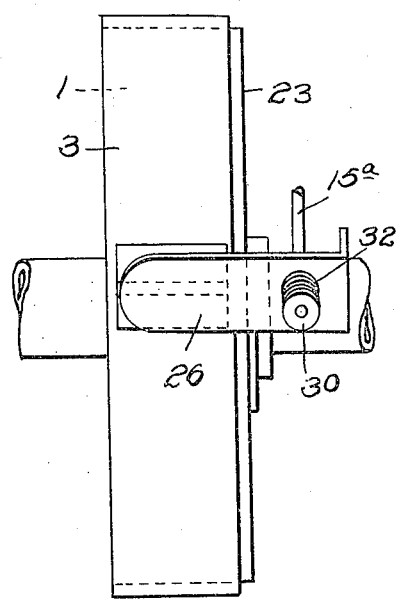
FIG. 5.
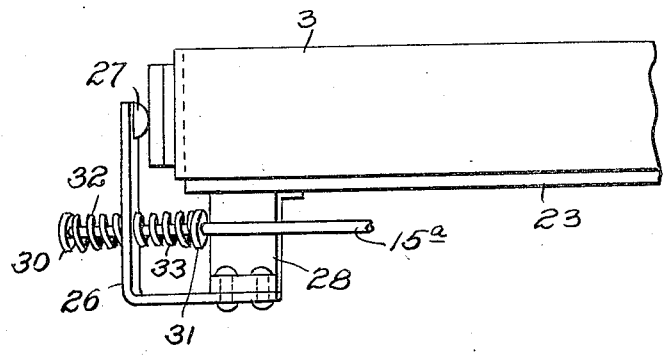
WITNESSES
J. Herbert Bradley.
INVENTOR
William J. Loury
by Winter & Brown
his attorneys

UNITED STATES PATENT OFFICE.

WILLIAM J. LOURY, OF MONESSEN, PENNSYLVANIA.

BAND BRAKE.

1,402,365.   Specification of Letters Patent.   Patented Jan. 3, 1922.

Application filed January 5, 1921. Serial No. 435,100.

*To all whom it may concern:*

Be it known that I, WILLIAM J. LOURY, a citizen of the United States, and a resident of Monessen, in the county of Westmoreland and State of Pennsylvania, have invented a new and useful Improvement in Band Brakes, of which the following is a specification.

The invention relates to band brakes of the general type now commonly used on automobiles and like vehicles, although the invention is not limited to brakes for any particular purpose.

Band brakes of the type contemplated herein comprise a drum around which there extends a flexible brake band adapted to be tightened upon the drum by drawing its ends together. The band consists of an outer metal portion having an inner lining of fabric or other material especially constructed to resist wear to as great an extent as possible. It is a common observance and experience of users of automobiles or other structures provided with such band brakes that the lining wears away much more rapidly at and near the ends of the band than throughout the portion intermediate of the ends. It frequently happens that the ends of the lining become worn down entirely to the metal backing while the intermediate portion will show scarcely any wear whatsoever. The outcome of this is that linings must be renewed or replaced much before they have rendered their maximum service, and this involves a considerable item of expense, both for the cost of the lining itself and for the work involved in attaching it.

The object of the invention is to provide a band brake, the lining of which will wear down much more uniformly than in the brakes as they are now constructed, to the end that the lining will give much longer service, and the brake will give greater braking power with softer action.

The invention is illustrated in the accompanying drawings of which Fig. 1 is a face view of a band brake applied to an axle of an automobile; Fig. 2, a left end view of the brake as seen in Fig. 1; Fig. 3, a view corresponding to the left hand portion of Fig. 1 showing a modification of construction; Fig. 4 a view similar to Fig. 3 showing a still further modification of construction; and Figs. 5 and 6 plan and left end views, respectively, of the modification illustrated in Fig. 4.

In the practice of the invention, a brake drum is provided with a flexible brake band, lever or equivalent mechanism is provided for tightening the band upon the drum, and means are provided for applying pressure upon the band towards the drum at a point intermediate the ends of the band, the pressure being applied to the band simultaneously with the tightening of the band by the lever mechanism.

In the illustrative embodiment of the invention a brake drum 1 is indicated as being attached to an axle 2 and as being provided with a flexible brake band 3 which extends around the drum with its ends adjacent to each other. The lever mechanism for drawing the ends of the band together for tightening it upon the drum is merely illustrative of quite a number of forms of such mechanism now commonly used for this purpose. The ends of the brake band are provided with laterally extending lugs 4 and 5, normally urged away from each other by a spring 6 surrounding a pin 7 extending freely through the lugs. A bent lever 8, having a fixed pivot point 9, is pivotally connected to the lower end of the pin 7, as at 10; so that, when the lever is moved to the right as viewed in Fig. 1 and as indicated by the arrow, the lug 5 will be drawn towards the lug 4. For so moving the lever 8, its upper end is pivotally attached to one end of a link 11, the other end of which link is pivotally secured to an arm 12 attached to a shaft 13 adapted to be rocked by the brake operating lever in the manner well understood.

Various forms of construction may be used for applying pressure to the brake band intermediate of its ends simultaneously with the tightening of the band upon the drum, and such pressure may be provided at as many points as are desired upon the band. In the embodiment of the invention illustrated in Figs. 1 and 2, a bell crank lever is arranged to have one of its arms attached to the lever mechanism for tightening the brake band and its other arm in a position to press inwardly upon the brake band. Specifically, an arm 14 of a bell crank lever is pivotally connected at its outer end to a rod 15 which is pivotally connected in turn to the arm 12. To afford a yielding connection between the rod 15 and arm 14, the outer end of the rod may be provided with a head 16 arranged for longitudinal movement in a casing 17 and held normally in the position indicated in Fig. 1 by means of a spring 18. The second arm 19 of the bell crank lever is arranged to bear upon a guard member 20 such as is usually attached to a brake band substantially midway between its ends for preventing the band from slipping around the drum. The end of the arm 19 may be variously shaped to cause the required inward pressure upon the guard member. As shown in the drawings, it is provided with a knob. The bell crank lever is pivotally mounted in a bushing 21 formed on the end of a plate 22 which may be attached to the casing 23 at the side of the drum 1.

As previously indicated, pressure may be applied to the brake band at as many places as are desired intermediate the ends of the band. In the modification of construction illustrated in Fig. 3, a shoe 24 is pivotally attached to the end of an arm $19^a$ of a bell crank lever arranged the same as that of Figs. 1 and 2. The shoe is cupped out centrally so as to extend over the guard member $20^a$, and bears at its outer ends directly upon the brake band at two points. That the upper end of the shoe may not drag upon the band when the brake is released, the lever arm $19^a$ may be provided with a projection 25 against which the outer face of the lower end of the shoe bears when the brake is released.

A second modification of construction is illustrated in Figs. 4, 5 and 6, in which a spring member is used in place of a bell crank lever. A spring 26, bent in the manner indicated in Fig. 5, is provided at its outer end with a knob 27 adapted to bear upon the guard member of the brake band, and is secured at its other end to a substantially Z-shaped bracket 28, which in turn is attached to the brake drum casing in a manner similar to the connection of the plate 22 of Fig. 1. For drawing the spring member 26 towards the brake band, a rod $15^a$, corresponding to the rod 15 of Fig. 1, may extend directly through an opening in the spring member, and the rod may be provided with a head 30 and a shoulder 31, between which, and the spring member, there may be arranged springs 32 and 33.

In the operation of each embodiment of the invention, the brake band is tightened upon the drum by operating the brake lever to rock the shaft 13 so as to move the link 11 in the manner indicated by the arrow adjacent to it. Simultaneously with such tightening of the band, pressure is applied to the band at a point or at points intermediate of its ends. By so applying pressure to the brake band, greater braking action results from a given movement of the brake lever than if the lever were merely effective to draw the ends of the brake band towards each other. Also, the intermediate portions of the brake band become worn simultaneously with the end portions with the result that the brake band gives longer service.

According to the provisions of the patent statutes, I have described the principle and operation of my invention together with the construction which I now consider to represent the best embodiment thereof. However, I desire to have it understood that, within the scope of the appended claims, the invention may be practiced by other forms of construction than specifically shown and described herein.

I claim:

1. In a band brake, the combination of a drum, a flexible brake band extending around the drum, lever mechanism for tightening the band upon the drum, and means for applying pressure upon the band towards the drum at a point intermediate the ends of the band simultaneously with the tightening of the band.

2. In a band brake, the combination of a drum, a flexible brake band extending around the drum, lever mechanism for tightening the band upon the drum, a member intermediate the ends of and movable towards the band for pressing the band upon the drum, and a connection between said lever mechanism and movable member for pressing the member upon the band simultaneously with the tightening of the band upon the drum.

3. In a band brake, the combination of a drum, a flexible brake band extending around the drum, lever mechanism for drawing the ends of the band together for tightening it upon the drum, and a bell crank lever having one arm adapted to bear upon said band intermediate of its ends and having its other arm pivotally connected to said lever mechanism, whereby pressure is applied to the exterior of the brake band simultaneously with the tightening of the band.

4. In a band brake, the combination of a drum, a casing at the side of the drum, a flexible brake band extending around the drum, lever mechanism for drawing the ends of the band together for tightening it upon the drum, a bracket secured to said casing, a member attached to said bracket and movable towards the band for pressing it upon the drum, and a connection between said lever mechanism and movable member for pressing the member upon the band simultaneously with the tightening of the band upon the drum.

5. In a band brake, the combination of a drum, a casing at the side of the drum, a flexible brake band extending around the drum, lever mechanism for drawing the ends of the band together for tightening it upon the drum, a bracket secured to said casing, and a bell crank lever pivotally mounted on said bracket having one arm arranged to move towards and press upon said band intermediate of its ends and having its other arm connected to said lever operating mechanism, whereby pressure is applied to the exterior of the brake band simultaneously with the tightening of the band by the lever mechanism.

In testimony whereof, I have hereunto set my hand.

WILLIAM J. LOURY.

Witnesses:
 PAUL N. CRITCHLOW,
 EDWIN O. JOHNS.